Figure 1:
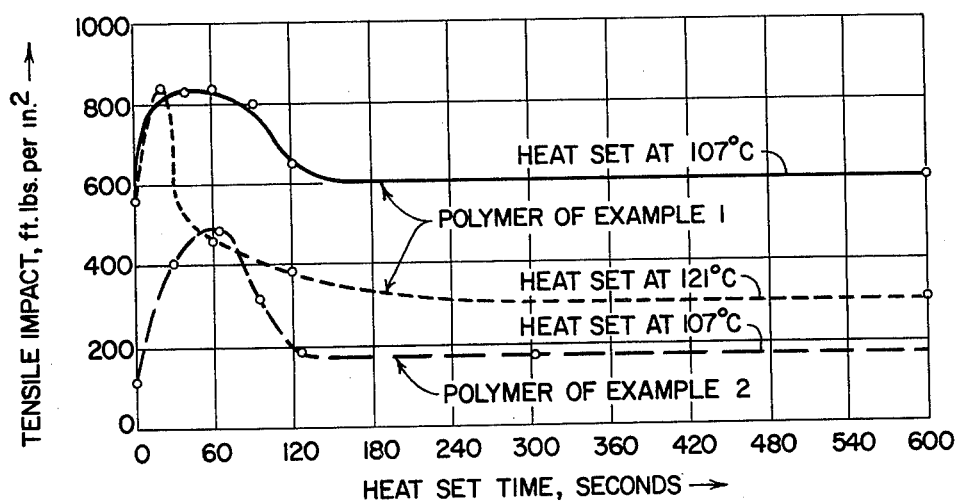

United States Patent [19]

Isley

[11] 4,006,211
[45] Feb. 1, 1977

[54] METHOD FOR IMPROVING IMPACT STRENGTH IN HIGH NITRILE POLYMERS BY STRETCHING AND HEAT SETTING

[75] Inventor: Ralph E. Isley, Northfield, Ohio

[73] Assignee: Standard Oil Company, Cleveland, Ohio

[22] Filed: May 27, 1975

[21] Appl. No.: 580,893

Related U.S. Application Data

[63] Continuation-in-part of Ser. No. 438,615, Feb. 1, 1974, abandoned.

[52] U.S. Cl. .............................. 264/291; 264/182; 264/210 R; 264/289; 264/346
[51] Int. Cl.[2] .......................................... B29D 7/24
[58] Field of Search ............... 264/182, 210 R, 291, 264/289

[56] References Cited

UNITED STATES PATENTS

| | | | |
|---|---|---|---|
| 3,275,612 | 9/1966 | Bechtold | 264/289 |
| 3,388,202 | 6/1968 | Opferkuch, Jr. et al. | 264/182 |
| 3,458,617 | 7/1969 | Isley et al. | 264/289 |
| 3,821,348 | 6/1974 | Planz | 264/184 |

Primary Examiner—Robert F. White
Assistant Examiner—James B. Lowe
Attorney, Agent, or Firm—John F. Jones; Sherman J. Kemmer

[57] ABSTRACT

High nitrile polymer articles having improved impact strength and dimensional stability are prepared by stretching in more than one direction a solvent-free, thermoformed polymer article having less than 0.5 percent water and then heat setting the oriented article while in a restrained position at orientation temperatures for about 5 seconds to 2.5 minutes.

9 Claims, 4 Drawing Figures

METHOD FOR IMPROVING IMPACT STRENGTH IN HIGH NITRILE POLYMERS BY STRETCHING AND HEAT SETTING

This application is a continuation-in-part of co-pending patent application Ser. No. 438,615, filed Feb. 1, 1974, now abandoned.

This invention relates to a process for the manufacture of shaped articles from high nitrile polymers. More particularly this invention pertains to the manufacture of acrylonitrile polymer articles having improved impact strength and dimensional stability by the process of heat setting the oriented article at orientation temperatures.

Heat setting is normally carried out on high performance fibers and films. With molded shapes, however, it is more difficult to heat and cool the article without distortion. In the oriented fiber field, it has long been common practice to linearly stretch fibers at an appropriate temperature and then permit them to shrink back to a slight degree. This practice is said to remove stresses and to toughen the fiber. In the present invention, however, this same effect is obtained by heat setting the shaped article while it is retained in a stretched position so that the dimensions of the article remain unchanged.

The practice of annealing is also commonly associated with molded articles or other fabricated shapes. However, the heat setting operation in the present invention is carried out at a much higher temperature than usual annealing temperatures and is more effective for removing strains. Annealing does not entail mechanically restraining the shaped article to retain its original dimensions. It is therefore essential that the annealing temperature be below the glass transition temperature of the polymer, whereas the orientation and heat setting operation of the present invention must be carried out above the glass transition temperature.

In the process of the present invention, the heat setting operation which is carried out after orientation is conveniently done at orientation temperature. The short additional time of heating the article while in a restrained position not only further reduces tensions in the oriented article but unexpectedly results in increased impact strength over and above that of the oriented, non-heat set article. When the oriented shape is forcibly restrained in the extended position at the orientation temperature for as little as 20 seconds, the tensile impact strength may be increased by as much as 35% as compared with a similarly oriented but non-heat set article. This improvement in impact strength with heat setting is surprising, since normally it would be expected that heat setting would result in a loss of orientation with an accordant loss in impact strength.

Heat setting the oriented article as taught in the present invention also further improves its dimensional stability over and above that of the oriented, non-heat set article, and dimensional stability outside the fiber field is difficult to retain while maintaining a satisfactory fabricated article. These observations of improvement in impact strength and dimensional stability are the basis for the present invention.

The nitrile polymers to which this invention pertains include those resinous polymers and interpolymers produced by polymerizing a major proportion of a monounsaturated nitrile, such as acrylonitrile, and a minor proportion of another monovinyl monomer component copolymerizable with said nitrile in an aqueous medium, and optionally said copolymerization is carried out in the presence of a preformed diene rubber which may be a homopolymer or a copolymer of a conjugated diene monomer.

The olefinically unsaturated nitriles useful in the present invention are the alpha, beta-olefinically unsaturated mononitriles having the structure

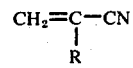

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which are useful in this invention includes one or more of the esters of olefinically unsaturated carboxylic acids, vinyl esters, vinyl ethers, alpha-olefins, vinyl aromatic monomers, and others.

The esters of olefinically unsaturated carboxylic acids include those having the structure

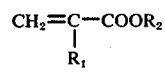

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

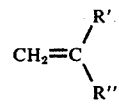

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, isopropyl styrenes, and the like, such as o-, m-, and p-isopropyl styrenes, and mixtures of the same. The most preferred vinyl aromatic is styrene.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl butadiene-1,3, and the like. Most preferred for the purpose of this invention are butadiene and isoprene because of their ready availability and their excellent copolymerization properties.

Polymerizates of particular utility in this invention and details of their method of preparation are described in U.S. Pat. Nos. 3,426,102, 3,586,737 and 3,763,278.

The polymerizates useful in the process of this invention are those prepared by the polymerization of 100 parts by weight of (A) at least 50% by weight of at least one nitrile having the structure

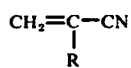

wherein R has the foregoing designation and (B) up to 50% by weight based on the combined weight of (A) and (B) of at least one member selected from the group consisting of (1) an ester having the structure

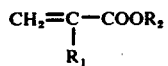

wherein $R_1$ and $R_2$ have the foregoing respective designations, (2) an alpha-olefin having the structure

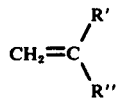

wherein R' and R" have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene and a nitrile monomer having the structure

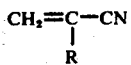

wherein R has the foregoing designation, said rubbery polymer containing from 50 to 100% by weight of polymerized conjugated diene and from 0 to 50% by weight of comonomer.

Preferably, component (A) should be present in from about 60 to 90% by weight based on the combined weight of (A) and (B) and the rubbery polymer (C) should contain more than 50% by weight of conjugated diene and more preferably from 60% to 90% by weight of the conjugated diene.

The polymeric compositions of the present invention can be prepared by any of the known general techniques of polymerization including the bulk polymerization, solution polymerization and emulsion or suspension polymerization techniques, by batch, continuous or intermittent addition of the monomers and other components. The polymerization is preferably carried out by means of aqueous emulsion or suspension techniques in the presence of an emulsifier, molecular weight modifier, and a free-radical generating polymerization initiator at a temperature of from about 0° to 100° C in the substantial absence of molecular oxygen. It is also preferred that the monomers be copolymerized in the presence of an emulsion or suspension of the preformed rubber. The product of the aqueous emulsion polymerization is usually in the form of a latex, and the copolymers may be recovered from the latex by any suitable means such as by coagulation with electrolytes or solvents, by freezing, or the like.

The polymerizates useful in the process of this invention can contain compounding ingredients and additives, pigments, colorants, stabilizers, fillers, etc., as is well known in the art so long as the balance between impact strength, flexural strength, tensile strength, processability, heat distortion temperature, and the like, is not affected to such a degree that the article is no longer useful for its intended purpose.

In the processing of the resins of this invention the latex of the polymers is coagulated with an electrolyte such as aqueous aluminum sulfate, subsequently washed with water and dried to a moisture content of less than 0.5% by weight. The solvent-free, dried resin is then subjected to thermoforming by various known thermoforming techniques such as by extrusion, calendering, machining, milling, molding, drawing, blowing, and the like. This process is to be distinguished from the processes in the prior art, as described in U.S. Pat. Nos. 3,437,717, wherein a film is produced from a casting of a polymer-solvent mixture.

According to the process of this invention the aforementioned thermoformed article is oriented by stretching at a selected temperature, usually in a gaseous atmosphere such as air or nitrogen, in more than one direction, simultaneously or sequentially, to form an oriented product while holding the article under tension to restrict dimensional change. In the orientation operation it is desirable to employ temperatures of from about 85° C to about 150° C and preferably temperatures in the range of from about 100° C to 140° C. The temperatures, however, are dependent to some extent on the composition of the resin. For example, orientation of an acrylonitrile-styrene copolymer is preferably carried out at a temperature of from about 125° C to 140° C, whereas orientation of an acrylonitrile-acrylate ester copolymer is preferably carried out at a temperature in the range of about 100° C to 125° C. The stretch ratio of stretch length to original length employed in the orienting operation can be from about 1.2:1 to 10:1, and preferably from about 1.5:1 to 5:1.

The oriented, shaped polymer article is then heat set, by holding the article in the restrained position so that it cannot retract either laterally or longitudinally, and heating it at a temperature from about 85° C to about 150° C for a fraction of a second up to about 3 minutes. The length of time the article is retained in the stretched position will depend to some degree upon the heat set temperature employed. For the higher heat set temperatures, shorter periods of time are required. Most preferred are heat set times of from about 5 seconds to about 2.5 minutes. As in the orientation step, the temperature for heat setting is also dependent to some extent on the composition of the polymer being processed, where somewhat higher temperatures are generally employed for acrylonitrile-styrene type copolymers than for copolymers of the acrylonitrile-acrylate ester type. Preferably, heat setting is carried out within the temperature range of about 100° to 140° C. Heat-set temperatures above about 150° C, however, have an adverse effect on the physical properties of the polymers.

The oriented, heat set polymer article is then gradually cooled below the glass transition temperature of the polymer to at least below about 85° C, and preferably to room temperature before it is released from the mold. It is also possible, however, to conduct the heat setting operation after the oriented article has been cooled by clamping the cooled article in a frame or mold and heating in an air circulating oven or by other methods of heating at the desired temperature. In such a procedure the heat set temperature may differ from the specific orientation temperature employed, but should remain within the orientation temperature range. This procedure, however, is less convenient than the practice of carrying out the heat set operation immediately following orientation and prior to cooling.

The polymer articles obtained by the process of this invention have excellent solvent resistance, and their impact strength and low permeability to gases and vapors make them very useful in the packaging industry, and they are particularly useful in the manufacture of bottles, film and other types of containers for liquids and solids.

A better understanding of the process of this invention can be obtained from the following illustrative examples. In the examples, the amounts of ingredient are expressed in parts by weight unless otherwise indicated.

EXAMPLE 1

A. A rubber latex was prepared by polymerizing with continuous agitation at 45° C in the substantial absence of oxygen a mixture of the following ingredients:

|  | Parts |
| --- | --- |
| Acrylonitrile | 40 |
| Butadiene-1,3 | 60 |
| GAFAC RE-610[1] | 2.4 |
| Azo-bis-isobutyronitrile | 0.3 |
| t-Dodecyl mercaptan | 0.5 |
| Water | 200 |

[1]Which is a mixture of R—O—(CH$_2$Ch$_2$O—)$_n$PO$_3$M$_2$ and [R—O—(CH$_2$C-H$_2$O—)$_n$]$_2$PO$_2$M wherein n is a number from 1 to 40, R is an alkyl or alkaryl group and preferably a nonyl phenyl group, and M is hydrogen, ammonia or an alkali metal, which composition is sold by the General Aniline and Film Corp.

Before the reaction was initiated, the pH of the mixture was adjusted to about 8 with KOH. The polymerization was carried out for 22½ hours to a conversion of 92% and a total solids of 33.1%.

B. A high impact, gas barrier resin embodied in this invention was prepared by polymerization of a mixture of the following ingredients:

|  | Parts |
| --- | --- |
| Acrylonitrile | 75 |
| Methyl acrylate | 25 |
| Latex A (above) | 31.9 |
| Potassium persulfate | 0.06 |
| GAFAC RE-610 (emulsifier | 3.0 |
| n-Dodecyl mercaptan | 1.0 |
| Ethylene diamine tetracetic Acid (Versene acid) | 0.05 |
| Water | 200 |

The pH was adjusted to about 7 with KOH. The polymerization was carried out in the substantial absence of oxygen at 60° C for 20 hours so as to produce a conversion of 97% of a latex having 33% solids. The polymer was isolated from this latex by coagulation with dilute aqueous aluminum sulfate, [(Al$_2$SO$_4$)$_3$·18H$_2$O] containing 27 grams of aluminum sulfate per 100 grams of water in a ratio of 2 grams of alum to 100 grams of latex solids, and subsequently washed with water. The filtered but wet polymer crumb was dried at 46° C in a tray drier employing chemically de-humidified air that was re-circulated with a rather high flow rate. It was dried for 16 hours under these conditions and at the end of this period the polymer was found to contain 0.1% by weight of moisture.

The dried resin obtained was extruded in the form of sheet having a thickness of 30 mils using a 2½ inches inside diameter plasticating screw extruder. Through the use of an adaptor, a 24-inch wide slot die having an 0.040 inch thick gap was attached. Extrudate was fed into a 0.030-inch gap between the two upper rolls of a "three roll stack" which is a take-off unit similar to a sheeting calender. The sheet was wrapped around the center roll and then run through the pressure gap between it and the third or bottom roll. The sheet was pulled across a cooling arrangement consisting of many idler rolls and then wound on a roll.

Specifically, the screw employed was a two-stage design. It was hollow and air cooled during this experiment.

The extruder barrel was electrically heated employing four heat zones automatically controlled with the temperature measured by iron constantin thermocouples. Temperatures employed during the run from cold feed end to melt discharge for the four controlled zones were 182° C, 204° C, 182° C and 199° C, respectively.

The adaptor temperature was regulated by a method similar to the extruder barrel. In addition, the die was heated and controlled in three zones across its width. The adaptor temperature was 193° C and the die zones were each 199° C.

During this run, the screw was operated at 75 r.p.m. producing an output of 225 lbs./hr. at a pressure of 5,750 lbs./in.$^2$, measured at the exit from the extruder. Under these conditions, the polymer melt temperature was found to be 227° C when measured by a needle thermocouple pyrometer. This higher temperature was generated by shear flow conditions in this polymer.

The polishing rolls in the 3-roll stack were hollow and heated by hot oil circulated through them. Temperatures on top, center and bottom rolls were 13°, 82°and 82° C, respectively. A high quality transparent sheet of uniform gauge was produced.

The sheet was then simultaneously biaxially oriented by stretching in longitudinal and transverse directions in a sheet and film orienter. The device had a double pantograph head and was hydraulically powered. The orienter had adjustable stops so that the amount of stretch was pre-set and could be accurately reproduced. The samples employed for orientation were 4.4 inch squares with a 4-inch square working area, and they were pre-heated to equilibrium temperature prior to a stretching. The samples were oriented at a 3:1 linear draw ratio at a stretch rate of 13,000% per minute. After stretching, the samples were heat set at the orientation temperature by leaving the samples in the clamps for varying lengths of time up to 10 minutes. At the end of the prescribed length of time, the samples were gradually cooled by contact with a vacuum extractor plate that was maintained at room temperature, and cooling occurred within 5 seconds after stretching.

The properties of tensile impact strength, percent linear shrinkage, orientation release stress which is a measure of retained stress and predicts shrink behavior, and oxygen and water vapor transmissions were then determined on the oriented and heat set polymer samples. Tensile impact was measured by ASTM test method D 882-61T; linear shrinkage by ASTM test method D 1204-66; orientation release stress was determined by ASTM test method D 1504-61; oxygen transmission by ASTM test method D-1434; and water vapor transmission by ASTM test method E-96.

EXAMPLE 2

A copolymer of acrylonitrile and methyl acrylate was prepared by emulsion polymerization techniques with semi-continuous addition of the following components:

|  | Total charge [2]pphm | Initial charge pphm | Continuous feed pphm |
|---|---|---|---|
| Demineralized water | 200 | 190 | 10 |
| Acrylonitrile | 75 | 7.5 | 67.5 |
| Methyl acrylate | 25 | 2.5 | 22.5 |
| GAFAC RE-610 | 1.5 | 0.15 | 1.35 |
| [1]Mercaptate Q-43 | 1.5 | 0.15 | 1.35 |
| [3]Hampene K₄100 | 0.05 | 0.05 | — |
| Potassium persulfate | 0.06 | .006 | 0.054 |

[1]Pentaerythritol tetrakis-β-mercaptopropionate.
[2]Parts per hundred parts of monomer by weight.
[3]Potassium salt of ethylene diamine tetraacetic acid. (Hampshire Chemical)

Initially, 10% of the total charge of each component was added to the reactor, and the remaining 90% was added continuously over a 6 to 8 hour period. The reaction temperature was maintained at 68° C.

The polymer was then isolated from the latex, washed, dried, thermoformed into sheet, oriented and heat set in the same manner as in Example I.

EXAMPLE 3

A. An elastomer was prepared by polymerizing with continuous agitation at 60° C in the substantial absence of oxygen, a mixture of the following ingredients:

|  | Parts |
|---|---|
| Butadiene | 75.0 |
| Styrene | 25.0 |
| P & G Soap Flakes | 2.25 |
| t-Dodecyl Mercaptan | 0.7 |
| Sodium salts of polymerized alkyl naphthalene | |

-continued

|  | Parts |
|---|---|
| sulfonic acids (Daxad-11) | 0.1 |
| Potassium Persulfate | 0.2 |
| Water | 200 |

The polymerization was carried out for 15 hours to a conversion of about 97.7% and a total solids of about 33.3%.

B. An impact-resistant, gas barrier graft copolymer was prepared by polymerizing a mixture of the following ingredients:

|  | Parts |
|---|---|
| Acrylonitrile | 9.4/67.5 |
| Styrene | 0.6/22.5 |
| Elastomer solids (obtained from (A)) | 42.8 |
| Alkylphenoxy-poly(ethyleneoxy)ethyl ester of phosphoric acid (GAFAC RE-610, emulsifier) | 1.25 |
| Mercaptate Q-43 (chain transfer agent) | 1.9 |
| Citric acid | 0.2 |
| Azo-bis-isobutyronitrile (initiator) | 0.05/0.05 |
| Water | 260 |

In the preparation of the resin, the emulsifier (GAFAC RE-610) and citric acid were dissolved in water and charged to the reactor. To this were added the elastomer, azo-bis-isobutyronitrile, 9.4 parts of acrylonitrile and 0.6 parts of styrene with stirring. The reactor was purged with nitrogen and the temperature was raised at 65° C. Fifteen minutes after this temperature was reached the addition of a solution of 67.5 parts of acrylonitrile, 22.5 parts of styrene and 1.9 parts of the chain transfer agent was begun and was continued over a period of 4½ hours. The reaction was continued for 15 minutes longer, after pumping of the monomer feed ceased, and the reactor was cooled and stripped for 2 hours under vacuum.

The resin was isolated from the latex by coagulation with dilute aqueous aluminum sulfate, and the polymer was then washed and dried as in Example 1. The dried resin was then thermoformed into sheet, oriented and heat set as hereinbefore described in Example 1.

The effect of heat set temperature and duration of the heat set treatment on the properties of tensile impact and orientation release stress for the polymer articles prepared in Examples 1 to 3 are shown graphically in FIGS. 1 to 4 and by the corresponding numerical data summarized in Tables 1 to 3. FIG. 1 and the corresponding data in Table 1 show correlations between the tensile impact strength and the heat set time for the resins of Examples 1 and 2, where the resins were oriented and heat set at two temperature levels, 107° C and 121° C. These curves demonstrate the unexpected maximum in the tensile impact obtained for the heat set times of less than about 2.5 minutes.

Figure 2:
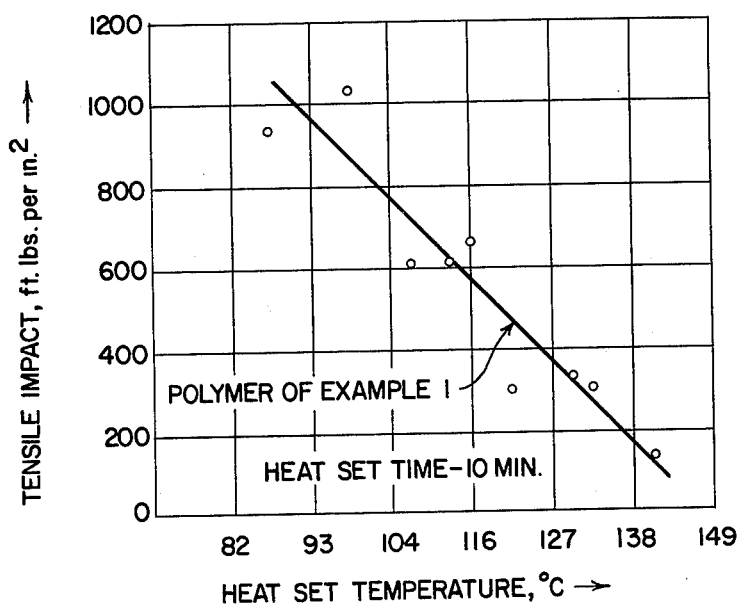

The correlation shown in FIG. 2 and by the corresponding data in Table 2 for resin prepared in Example 1 shows what would normally be expected using longer heat set treatment, that is, orientation and hence tensile impact strength diminish with increasing temperatures and a 10 minute heat set time.

Figure 3:
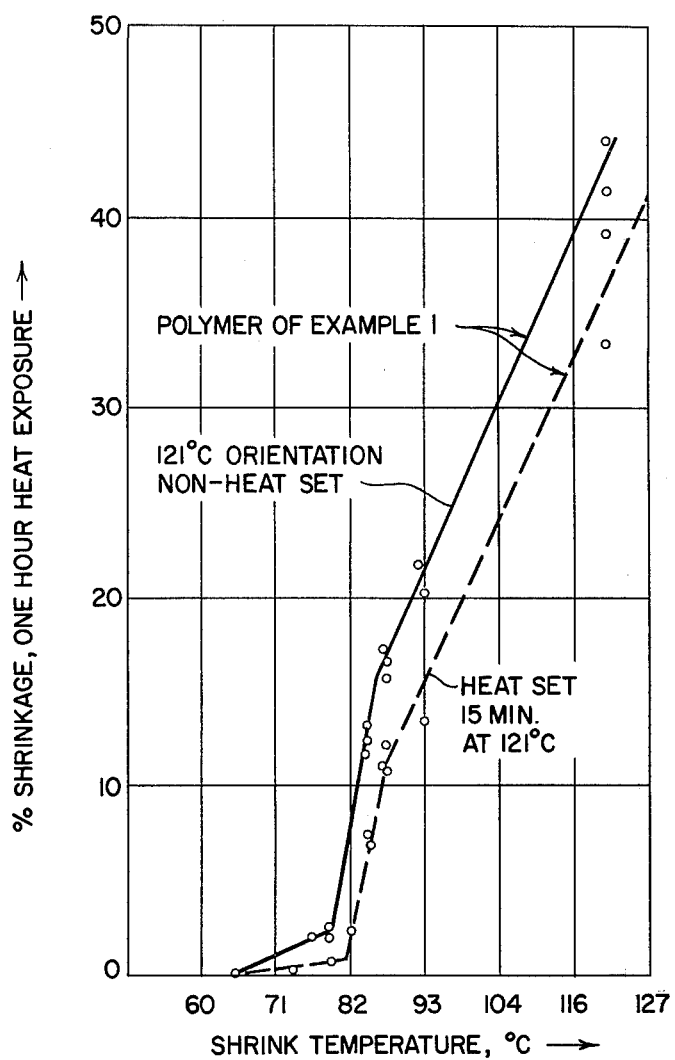
Figure 4:
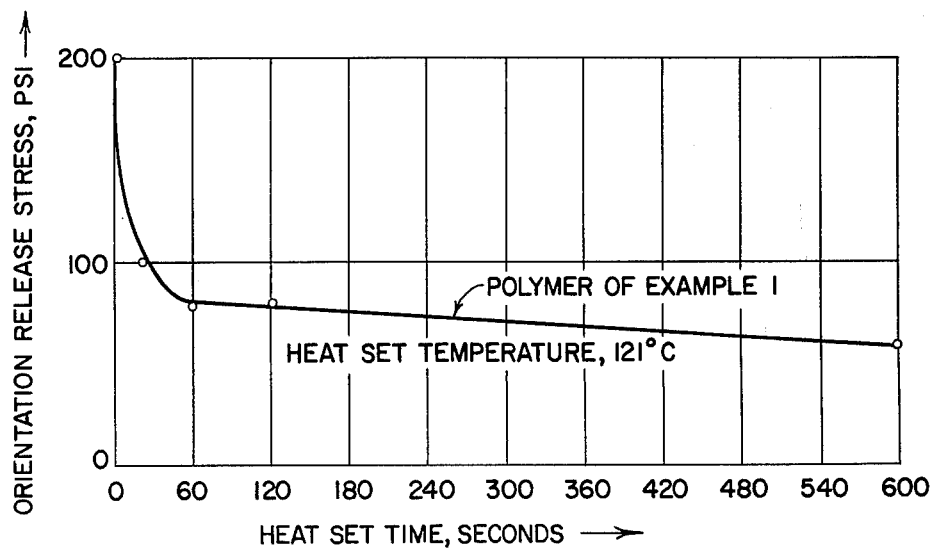

The effect of heat setting on the percent of linear shrinkage and orientation release stress, which is indicative of the tendency for the resin to shrink, is shown by the data given in FIGS. 3 and 4 and in Tables 1 and 3.

These properties were measured on resins prepared in Example 1. The data in FIG. 3 and in Table 3 compare the degree of shrinkage that occurs in the oriented, heat set and non-heat set resins in the temperature range of 65° to 121° C. These data show a definite improvement in the dimensional stability of the heat set resin over the non-heat set resin.

The reduction in orientation release stress with heat set time for resins heat set at 121° C is demonstrated in FIG. 4 and in Table 1. The curve shows a rapid decline in stress for the first 60 seconds of heat set time and then gradually diminishes to a constant stress level.

The effect of time and temperature of the heat set operation on the tensile impact strength and dimensional stability of resins prepared in Example 3 were essentially the same as for the resins of Examples 1 to 2.

Table 1

Effect of Time and Temperature of Heat Set on Properties of Acrylonitrile-Methyl Acrylate Polymers

| | POLYMER OF EXAMPLE 1 | | | |
|---|---|---|---|---|
| Orientation Temp.° C | Heat Set Time (Sec.) | Heat Set Temp. ° C | Tensile Impact Ft. lbs./in² | Orientation Release Stress, psi |
| 107 | Non-heat set | | 643 | |
| 107 | 20 | 107 | 826 | 177 |
| 107 | 40 | 107 | 833 | |
| 107 | 60 | 107 | 838 | 152 |
| 107 | 90 | 107 | 802 | 222 |
| 107 | 120 | 107 | 658 | 129 |
| 107 | 600 | 107 | 605 | 103 |
| 121 | Non-heat set | | 559 | 203 |
| 121 | 20 | 121 | 840 | 98 |
| 121 | 60 | 121 | 457 | 79 |
| 121 | 120 | 121 | 384 | 80 |
| 121 | 600 | 121 | 299 | 60 |

| | POLYMER OF EXAMPLE 2 | | |
|---|---|---|---|
| Orientation Temp.° C | Heat Set Time (Sec.) | Heat Set Temp. ° C | Tensile Impact Ft. lbs./in² |
| 107 | Non-heat set | | 91 |
| 107 | 30 | 107 | 393 |
| 107 | 60 | 107 | 472 |
| 107 | 90 | 107 | 310 |
| 107 | 120 | 107 | 177 |
| 107 | 300 | 107 | 170 |

Table 2

Effect of Heat Set Temperature on Tensile Impact of Acrylonitrile-Methyl Acrylate Polymer

| | POLYMER OF EXAMPLE 1 | | | | | |
|---|---|---|---|---|---|---|
| Orientation Temp.° C | Heat Set Time (Sec.) | Heat Set Temp. ° C | Tensile Impact Ft. lbs/in² | Orientation Release Stress,psi | Oxygen Transmission, cc Mil/100 in²/Atm/24 hrs. | Water-Vapor Transmission g/100 in²/24 hrs. |
| 87 | 600 | 87 | 927 | 184 | .557 | 3.79 |
| 98 | 600 | 98 | 1024 | 150 | .477 | 3.76 |
| 107 | 600 | 107 | 605 | 103 | | |
| 112 | 600 | 112 | 610 | 75 | | |
| 115 | 600 | 115 | 654 | 77 | | 4.27 |
| 121 | 600 | 121 | 299 | 60 | | |
| 132 | 600 | 132 | 294 | 67 | | |
| 121 | 600 | 141 | 122 | 45 | | |

Table 3

Effect of Heat Set Treatment on Dimensional Stability of Acrylonitrile-Methyl Acrylate Polymer

| | POLYMER OF EXAMPLE 1 | |
|---|---|---|
| Orientation Temp., ° C | 121 | 121 |
| Heat Set Temp., ° C | None | 121 for 15 min. |
| Shrink Test Temp., ° C | % Linear Shrinkage | % Linear Shrinkage |
| 65 | 0.180 | 0.115 |
| | 0.121 | |
| 74 | | 0.350 |
| 79 | 2.00 | 0.88 |
| | 2.25 | |
| 82 | | 2.30 |
| 85 | 11.59 | 6.92 |
| | 13.04 | 7.45 |
| | 12.20 | |
| 88 | 17.14 | 10.92 |
| | 16.55 | 10.99 |
| | 15.76 | 12.02 |
| 99 | 19.9 | 13.45 |
| | 21.70 | |
| 121 | 43.8 | 33.2 |
| | 41.01 | 39.06 |

I claim:

1. A process for improving the impact strength and dimensional stability of a polymer article consisting essentially of:

orienting a solvent-free, thermoformed polymer article containing less than 0.5% by weight of water, by stretching in more than one direction in a linear stretch ratio of about 1.5:1 to 5:1 in each direction of stretch within the temperature range of from about 85° to 150° C, then heat setting said oriented article within the orienting temperature range and for a period of from about 5 seconds to 2.5 minutes while the article is retained in its stretched condition, and wherein the polymer in said article is prepared by copolymerizing in an aqueous medium 100 parts by weight of:

A. from about 60 to 90% by weight of at least one nitrile having the structure

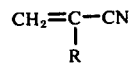

wherein R is hydrogen, a lower alkyl group having from 1 to 4 carbon atoms, or a halogen, and B. from about 40 to 10% by weight based on the combined weight of (A) and (B) of at least one member selected from the group consisting of:

1. an ester having the structure

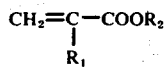

wherein $R_1$ is hydrogen an alkyl group having from 1 to 4 carbon atoms, or a halogen, and $R_2$ is an alkyl group having from 1 to 6 carbon atoms.

2. an alpha-olefin having the structure

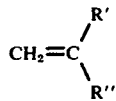

wherein R' and R" are alkyl groups having from 1 to 7 carbon atoms, 3. a vinyl ether selected from the group consisting of methyl vinyl ether, ethyl vinyl ether, the propyl vinyl ethers, and the butyl vinyl ethers.

4. vinyl acetate, and 5. styrene, wherein said monomers are copolymerized in the presence of from 0 to 40 parts by weight of:

C. a rubbery polymer of a conjugated diene monomer selected from the group consisting of butadiene and isoprene and optionally a comonomer selected from the group consisting of styrene and a nitrile monomer having the structure

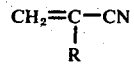

wherein R has the above designation, said rubber polymer containing from 50 to 100% by weight of polymerized conjugated diene and from 0 to 50% by weight of comonomer.

2. The process in claim 1 wherein the resulting heat set article is cooled while still under tension to a temperature below about 85° C and releasing the tension thereon.

3. The process in claim 1 wherein the oriented polymer article is cooled to a temperature below about 85° C prior to the heat setting operation.

4. The process in claim 2 wherein the heat setting is carried out at a temperature within the range of about 100° C to about 140° C.

5. The process in claim 4 wherein the heat setting time is within the range from about 5 seconds to 150 seconds.

6. The process in claim 1 wherein the component (A) is present in amounts of from about 60 to 90% by weight based on the combined weight of (A) and (B), and component (B) is correspondingly present in amounts of from about 40 to 10% by weight based on the combined weight of (A) and (B).

7. The process in claim 6 wherein the component (A) is a member selected from the group consisting of acrylonitrile and methacrylonitrile.

8. The process in claim 7 wherein component (B) is a member selected from the group consisting of methyl acrylate, ethyl acrylate, methyl methacrylate, and ethyl methacrylate.

9. The process in claim 7 wherein component (B) is styrene.

* * * * *